United States Patent
Arnold

(10) Patent No.: US 10,359,136 B2
(45) Date of Patent: Jul. 23, 2019

(54) RETAINING CATCH FOR A SOCKET PIPE CONNECTION

(71) Applicant: Duktus S.A., Luxembourg (LU)

(72) Inventor: Georg Arnold, Tulfes (AT)

(73) Assignee: DUKTUS PRODUCTION GMBH, Wetzlar (DE)

( * ) Notice: Subject to any disclaimer, the term of this patent is extended or adjusted under 35 U.S.C. 154(b) by 707 days.

(21) Appl. No.: 14/675,941

(22) Filed: Apr. 1, 2015

(65) Prior Publication Data

US 2015/0204469 A1    Jul. 23, 2015

Related U.S. Application Data

(63) Continuation of application No. PCT/EP2013/002802, filed on Sep. 18, 2013.

(30) Foreign Application Priority Data

Oct. 2, 2012   (AT) .................................. 1065/2012

(51) Int. Cl.
- *F16L 21/03*   (2006.01)
- *F16L 21/08*   (2006.01)
- *F16L 37/113*  (2006.01)

(52) U.S. Cl.
CPC ............ *F16L 21/03* (2013.01); *F16L 21/08* (2013.01); *F16L 37/113* (2013.01)

(58) Field of Classification Search
CPC ......... F16L 21/03; F16L 21/035; F16L 21/08; F16L 17/025; F16L 17/03; F16L 37/113
USPC ....... 285/339, 376, 377, 342, 343, 400, 401, 285/305
See application file for complete search history.

(56) References Cited

U.S. PATENT DOCUMENTS

| | | | | |
|---|---|---|---|---|
| 3,480,302 A | * | 11/1969 | Teague | F16L 21/08 285/400 X |
| 3,751,078 A | * | 8/1973 | O'Brian | 285/339 |
| 4,033,613 A | | 7/1977 | Bram | |
| 8,632,104 B2 | * | 1/2014 | Horikawa | F16L 37/113 285/377 X |
| 8,967,209 B2 | * | 3/2015 | Ho | 285/305 |

(Continued)

FOREIGN PATENT DOCUMENTS

| | | |
|---|---|---|
| DE | 10 2006 031 582 | 1/2008 |
| EP | 1 046 854 | 10/2000 |

OTHER PUBLICATIONS

International Search Report (ISR) dated Jan. 29, 2014 in International (PCT) Application No. PCT/EP2013/002802.

(Continued)

*Primary Examiner* — Greg Binda
*Assistant Examiner* — Zachary T Dragicevich
(74) *Attorney, Agent, or Firm* — Wenderoth, Lind & Ponack, L.L.P.

(57) ABSTRACT

A retaining catch for a socket pipe connection has a substantially circle-arc-shaped catch body, on which is arranged a protrusion which projects from the catch body. The catch body has a catch cross section in a cross-sectional plane as seen radially in a direction transverse to its circle-arc shaped longitudinal extent. The catch body has a bending portion, and the catch body, along the bending portion, has a reduction cross section which is reduced in size—as seen radially—in relation to the catch cross section.

14 Claims, 4 Drawing Sheets

(56) References Cited

U.S. PATENT DOCUMENTS

2009/0152866 A1 6/2009 Mutschlechner et al.
2016/0298797 A1* 10/2016 Caston .................... F16L 21/08

OTHER PUBLICATIONS

Austrian Office Action dated May 31, 2013 in Application No. 1065/2012.

* cited by examiner

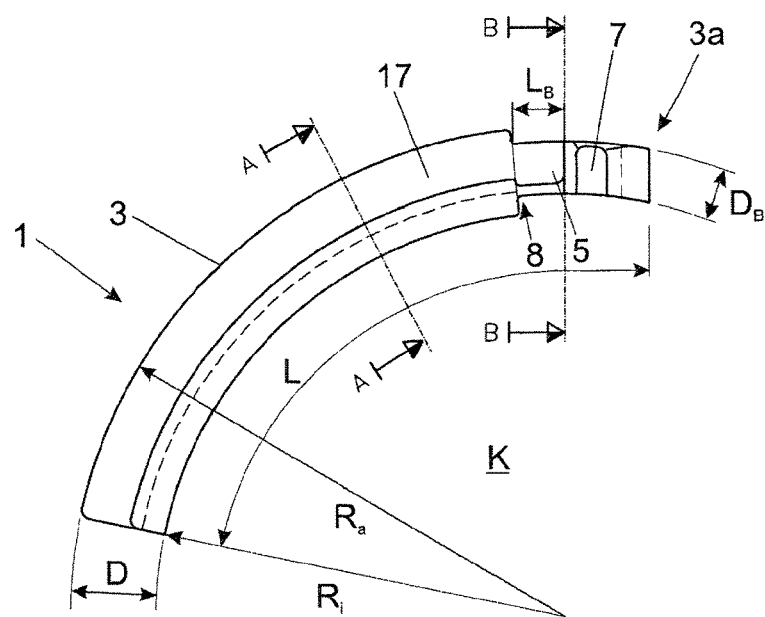
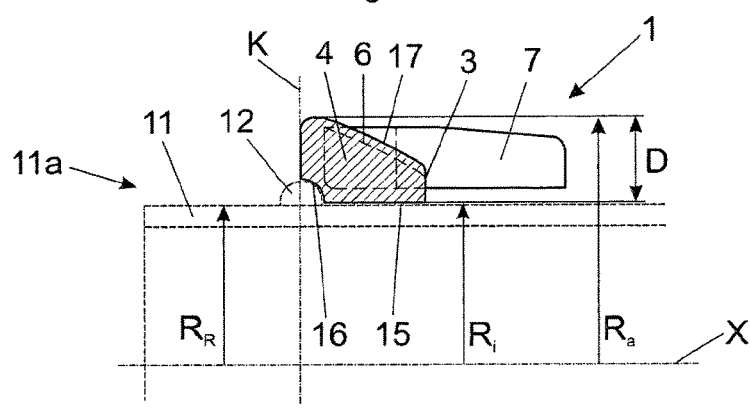
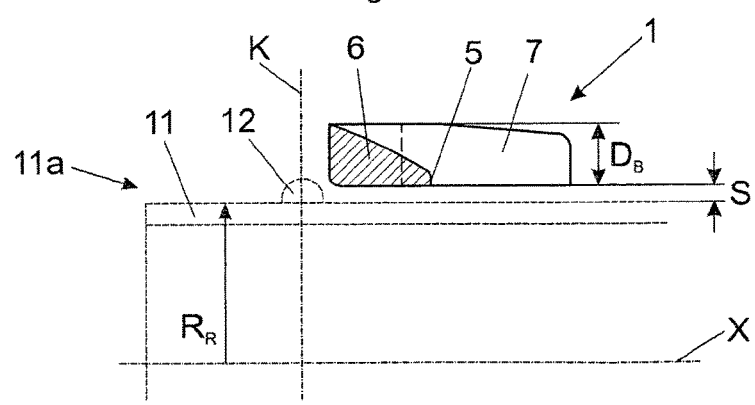

RETAINING CATCH FOR A SOCKET PIPE CONNECTION

BACKGROUND OF THE INVENTION

The invention concerns a retaining catch for a socket pipe connection having a substantially circular-arcuate catch body on which is arranged a projection projecting from the catch body. The catch body has a catch cross-section in a cross-sectional plane in a radial direction transversely relative to its circular-arcuate longitudinal extent.

Retaining catches of that kind are already known and are used in socket pipe connections for securing the same in relation to tensile forces. Thus, for example, EP 1 046 854 A2 discloses the use of two retaining catches of the general kind set forth for a socket pipe connection in a pipe end, in the form of a socket, of a first pipe, to a pipe end or insertion end of a second pipe, that is to be inserted into the socket. The pipe end of the first pipe, in the form of the socket, usually has in that case a radially inwardly projecting, peripherally extending limiting collar which in the peripheral direction has one or more openings which approximately correspond to the longitudinal extent of a retaining catch or are somewhat larger so that the retaining catches can be introduced into the socket connection by way of the openings. The end of the second pipe, that is to be introduced into the socket, typically has a peripherally extending contact collar which for example is in the form of a weld bead.

In order now to produce a socket pipe connection, usually the pipe portions (socket and insertion end) are firstly fitted together. Then for example two arcuate retaining catches of mirror-image configuration are introduced by way of an opening on the peripherally extending limiting collar on the socket into the interior of the socket until they bear against the contact collar at the insertion end of the second pipe and are then displaced radially towards the left or the right until a respective projection on the retaining catch bears against an edge of the limiting collar. To hold the retaining catches in that position, a spacer—which can be made from a flexible plastic material—can be arranged between the retaining catches. In the assembled position the retaining catches are disposed between the limiting collar of the socket and the contact collar of the second pipe. It is possible overall to achieve a uniform securing action in relation to tensile forces by virtue of a respective retaining catch on the left-hand side and on the right-hand side.

Socket pipe connections of that kind for pipes or shaped pipe portions are used in particular in pipe systems in the drinking water and waste water fields. In such pipe systems the pipes can be subjected to operating pressure of up to 100 bars or more, whereby high levels of longitudinal tensile forces can also act on the pipes.

The pipes in such pipe systems typically involve nominal widths of between DN 80 and DN 1000. In that case, the pipe ends in the form of the socket are usually provided with a peripherally extending sealing chamber and a peripherally extending thrust securing chamber provided in the end region of the socket. A sealing ring can be arranged in the sealing chamber to seal off the socket pipe connection. In the assembled position, the sealing ring bears both against the inside wall of the sealing chamber and also against the outside wall of the end of the second pipe, that is introduced into the socket, in sealing relationship. The thrust securing chamber has in the direction of the socket end a peripherally extending limiting collar which includes a peripherally extending thrust surface—which extends inclinedly relative to the axial extent of the socket. Openings are provided in the peripheral direction in that limiting collar in order to be able to introduce the retaining catches into the socket. The end of a second pipe, that is introduced into the socket, has a peripherally extending contact collar against which the retaining catches bear in the assembled position.

In such socket pipe connections, the longitudinal tensile securing action is implemented by acting longitudinal tensile forces being passed by way of the contact collar of the second pipe end to the retaining catches and then further by way of the peripherally extending limiting collar or its peripherally extending thrust surface into the thrust securing chamber of the socket. A socket pipe connection of the general kind set forth, depending on the respective nominal width of the pipes, is suitable for operating pressures of over 100 bars or admissible tensile forces of up to 200 kN.

For an optimum tensile securing effect with the lowest possible component stressing, the bending radii of the pipes and the retaining catches are matched to the best possible extent. In the ideal case, the outside pipe radius of the pipe end to be introduced into the socket substantially corresponds to the inside radius of a retaining catch and the outside radius of a retaining catch or its outside surface substantially corresponds to the inside radius of the limiting collar or its thrust surface.

As the pipes or shaped pipe portions to be connected however are subject to manufacturing tolerances, the differing bending radii of the components mean that in the assembled position severe bending forces can act on the retaining catches, which in the extreme case can even lead to breakage of a retaining catch. In particular, pipes or socket pipes of ductile cast iron—which are frequently used in pipe systems in the drinking water and waste water fields-, by virtue of their method of manufacture using a centrifugal casting method with a shaping rotating mold, are subject to corresponding manufacturing fluctuations.

SUMMARY OF THE INVENTION

The object of the invention is to avoid the above-described disadvantages and to provide a retaining catch which is improved over the state of the art. In particular, the invention seeks to provide that the retaining catch is more robust in relation to manufacturing fluctuations in the component parts of a socket pipe connection.

According to the invention, therefore, the catch body has a bending portion, wherein the catch body along the bending portion has a reduction cross-section which is reduced in size—viewed in the radial direction—in relation to the catch cross-section.

By virtue of the provision of a reduced cross-section for the catch body in the region of a bending portion, the retaining catch can well carry bending forces acting thereon as the retaining catch is bendable in the region of the bending portion substantially in the manner of a film hinge.

That bendability is advantageous in particular when the retaining catch at least partially and preferably substantially completely comprises a plastic material. As a retaining catch acts in the assembled position as a connecting element between the two pipes to be connected, the use of a retaining catch of plastic material is advantageous or necessary in particular where there is a requirement for an interruption in electrical conductivity of the pipes to be connected. That is the case in particular in installation situations in which unwanted creeping currents can occur without such an interruption in electrical conductivity, for example when the pipes to be connected involve water pipes which are laid in the ground in the region of streetcar rails.

Where in contrast conventional retaining catches of ductile cast iron have a comparatively high level of ductility by virtue of their material, increased bendability of the retaining catch by virtue of a bending portion of a reduced cross-section is advantageous in particular by virtue of the lower level of ductility of the material used in the case of retaining catches of plastic material. The increased bendability of the retaining catch by virtue of the bending portion with the reduced catch cross-section means that it is possible to use even very pressure-resistant plastic materials as the material for the retaining catch, which materials are often very brittle. Frequently, this involves materials which are reinforced with at least 40% of glass fiber and which even under a steady pressure loading do not have any serious creep properties. In addition, retaining catches of plastic material can be produced more inexpensively, in comparison with retaining catches of cast iron, in particular retaining catches for pipelines for up to about 16 bars operating pressure.

Suitable plastic materials for the retaining catches are for example the glass fiber-reinforced plastics SCANAMID 6 B12" F45 from Polykemi AB or Grivory XE 5041 from EMS-Grivory. In particular, when using brittle and/or pressure-resistant plastic materials the bending portion provides that stretching of the rest of the catch body can be kept within limits by the differences in radius involved between the socket of the first pipe and the insertion end of the second pipe, insofar as no cracks occur in the region of the inside radius on the retaining catch under pressure in the assembled position.

In a preferred embodiment of the invention, the reduction cross-section is between 50% and 80%, preferably between 60% and 70%, particularly preferably about 66%, of the catch cross-section. Preferably, a length of the bending portion is at least 10%, preferably at least 15%, of the longitudinal extent of the catch body.

To be able to put the retaining catch into a suitable end position upon insertion into a socket pipe connection, a projection is disposed on the catch body, and the projection projects from the catch body, preferably in a direction perpendicularly to the circular plane of the circular-arcuate catch body. In that case, the projection is preferably arranged at an end of the catch body.

It has proven to be particularly advantageous in that respect if the bending portion is arranged in the region of the projection. That is advantageous in particular when the insertion end of the second pipe has an outside radius larger than the inside radius of the retaining catch. In such a situation, in particular, the ends of the retaining catch are subjected to heavy loadings as they represent the contact pressure locations involved in an opening bending movement of the retaining catch, and the opening bending movement causes an expansion of the inside radius of the retaining catch in the direction of the outside pipe radius of the insertion end.

A particularly advantageous embodiment of the invention is one in which a transition from the catch cross-section to the reduction cross-section along the longitudinal extent is substantially arcuate. In the case of such a transition which is not abrupt but substantially continuous, it is possible to increase the breaking strength of the transition location.

Furthermore, a pipe socket includes:
- a first pipe end in the form of a socket of a first pipe, wherein in the interior the socket has at least regionwise a radially inwardly projecting peripherally extending limiting collar,
- a second pipe end of a second pipe, that is to be introduced into the socket, wherein at least a portion of the second pipe end has a peripherally extending contact collar, and
- at least one retaining catch arranged between the limiting collar and the contact collar.

In a preferred embodiment, at least one clamping device includes a first retaining catch, a second retaining catch provided in mirror-image relationship with the first retaining catch, and a spacer. In the assembled position, the spacer is arranged in the peripheral direction relative to the circular plane of the arcuate retaining catches between the first retaining catch and the second retaining catch, preferably between mutually facing projections of the two retaining catches.

In the case of larger pipe diameters, for example with nominal widths of between DN 300 and DN 500, it is also possible to provide a plurality of clamping devices. Thus, for example, two clamping devices can be provided for a socket pipe connection, which thus overall include two similar first retaining catches and two similar second retaining catches of a mirror-image configuration in relation to the first retaining catches.

BRIEF DESCRIPTION OF THE DRAWINGS

Further details and advantages of the present invention will now be described by means of the specific description hereinafter, in which:

FIG. 1a is a plan view of a proposed retaining catch in relation to a circular plane of the retaining catch, FIG. 1b is a cross-sectional view of the retaining catch of FIG. 1a along the radial section plane A-A in FIG. 1a, FIG. 1c is a cross-sectional view in the region of the bending portion of the retaining catch of FIG. 1a along the radial section plane B-B in FIG. 1a, FIG. 2 is a side view of a retaining catch in a further embodiment of the invention, FIG. 6b is an enlarged detail view of a region of FIG. 6a.

DETAILED DESCRIPTION OF THE INVENTION

Figure 2:
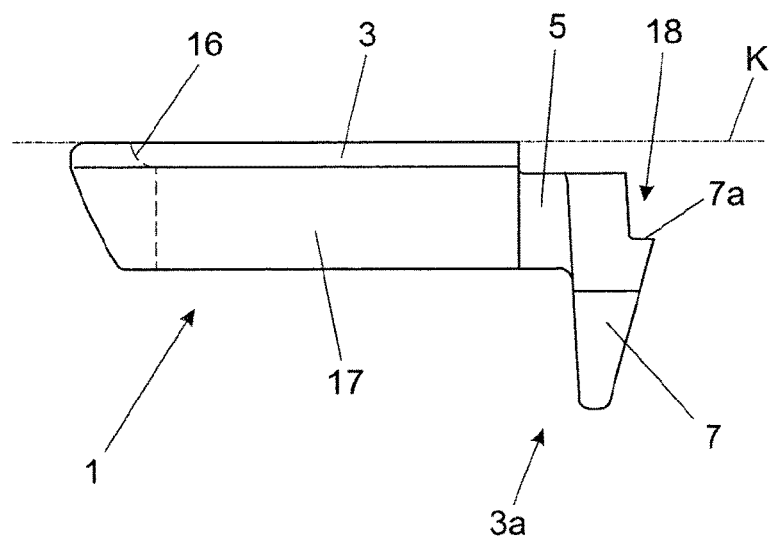

FIG. 1a shows a plan view of a proposed retaining catch 1 with a direction of view on to a circular plane K of the retaining catch 1. The retaining catch 1 has a circular arcuate catch body 3, wherein the catch body 3 in the radial direction has an inner catch inside radius $R_i$ and an outer catch outside radius $R_a$. The catch body 3 has a longitudinal extent L along its arcuate extent. Arranged at an end 3a of the catch body 3 is a projection 7 extending substantially perpendicularly to the circular plane. In the region of the projection 7, the catch body 3 has a bending portion 5 which has a reduced cross-section 6 (see FIG. 1c) which is reduced—as viewed in the radial direction—relative to the catch cross-section 4 (see FIG. 1b). In this case, the transition 8 from the catch cross-section 4 to the reduction cross-section 6 has an arcuate or rounded configuration, whereby the breaking strength of the transitional location can be increased. The bending portion 5 has a length $L_B$ along the arcuate extent of the catch body 3. In the radial direction, the thickness D of the catch body 3 at its widest location can be for example 24 mm whereas the radial thickness $D_B$ of the bending portion 5 at its widest location can be for example 16 mm.

FIG. 1b shows a cross-sectional view of the retaining catch 1 of FIG. 1a along the radial section plane A-A in FIG. 1a. This view additionally shows in broken line the pipe end 11a of a second pipe 11 which in relation to its pipe axis X has a peripherally extending contact collar 12 in the form of a weld bead. The catch body 3 has a catch cross-section 4 and a collar contact surface 16 which is matched to the contour of the contact collar 12 so that the retaining catch 1 can be applied in substantially positively locking relationship against the contact collar 12. The second pipe 11 has a pipe outside radius $R_R$. The circular plane K of the retaining catch 1 is substantially perpendicular to the pipe axis X and the catch inside radius $R_i$ approximately corresponds to the pipe outside radius $R_R$ of the second pipe 11 so that the retaining catch 1 can be applied with its pipe contact surface 15 against the outer peripheral surface of the second pipe 11 substantially in positively locking relationship. The reduction cross-section 6 of the bending portion 5 is already indicated in broken line in this view. This Figure does not show the socket 9a, surrounding the retaining catch 1, of the first pipe 9 of a socket pipe connection 2. Such a socket 9a usually has at the socket end a peripherally extending limiting collar 10 having a peripherally extending thrust surface 10a which extends inclinedly relative to the axial extent of the socket 9a or the pipe axis X. In the assembled position, the socket contact surface 17 of the catch body 3, that equally extends inclinedly relative to the pipe axis X and corresponding to the arcuate configuration of the catch body 3, bears against that thrust surface 10a of the socket 9a. In that case, a longitudinal tensile force securing action can be implemented by acting longitudinal tensile forces being passed by way of the contact collar 12 of the second pipe end 11a to the retaining catch 1 and further by way of the peripherally extending limiting collar 10 or its peripherally extending thrust surface 10a to the thrust securing chamber of the socket 9a.

FIG. 1c shows a cross-sectional view in the region of the bending portion 5 of the retaining catch 1 of FIG. 1a along the radial section plane B-B in FIG. 1a. The retaining catch 1 is in the assembled position as in FIG. 1b, wherein the pipe end 11a of the second pipe 11 is also indicated in broken line in the assembled position. As can be seen by comparison with FIG. 1b the retaining catch 1, in the region of the bending portion 5, has a reduction cross-section 6 which is reduced in relation to the catch cross-section 4. The bending portion 5 and the projection 7, in contrast to the rest of the catch body 3, also does not bear against the outside peripheral surface of the second pipe 11. The reduction cross-section 6 of the bending portion 5 and the provided radial clearance S of for example between about 1 mm and about 4 mm between the bending portion 5 or the projection 7 and the outside peripheral surface of the second pipe 11 means that the bending portion 5 can bend in the manner of a film hinge in order to cause the retaining catch 1 to bear against the second pipe 11 in spite of prevailing tolerance fluctuations in relation to the pipe outside radius $R_R$ of the second pipe 11.

Figure 3A:
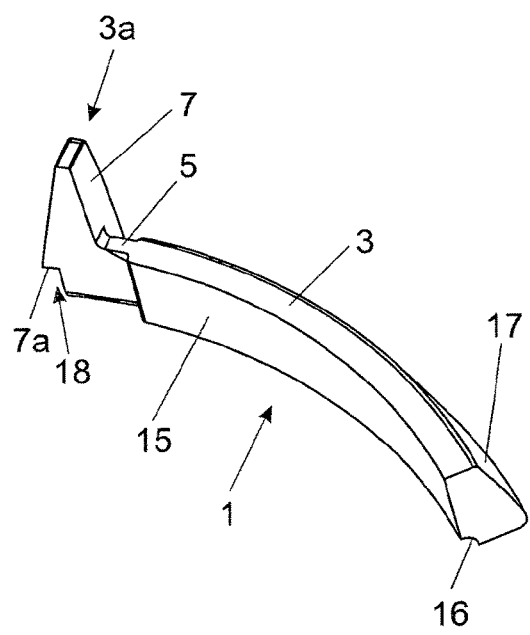
FIG. 3a is a perspective view of the retaining catch of FIG. 2.
Figure 3B:
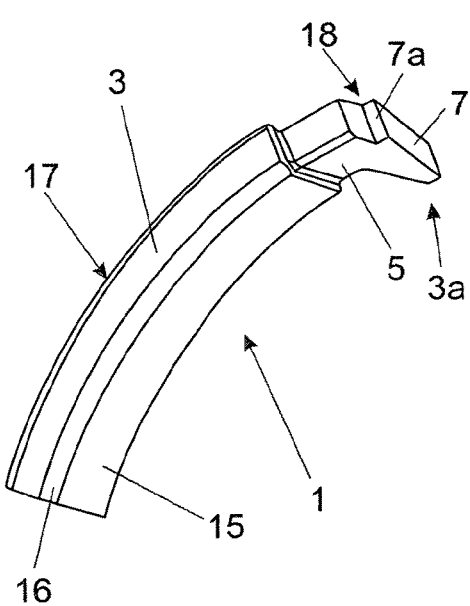
FIG. 3b is a further perspective view of the retaining catch of FIG. 2.

FIG. 2 shows a side view of a retaining catch 1 in accordance with a further embodiment of the invention, viewing on to the socket contact surface 17 of the catch body 3, that is the outer surface as viewed radially, while FIGS. 3a and 3b show perspective views of the retaining catch of FIG. 2. In the assembled position, the socket contact surface 17 which is inclined in relation to the pipe axis X bears against a peripherally extending thrust surface 10a (not shown here) of a peripherally extending limiting collar 10 of a first pipe end, in the form of socket 9a, of a first pipe 9. Shown in broken line is the collar contact surface 16 which is concealed in this viewing direction and which is of a configuration corresponding to the shaping of a contact collar 12 at the end 11a of the second pipe 11 (see FIG. 1b). The projection 7 at the end 3a of the catch body 3 has a recess 18 and a nose 7a whereby, in the context of a socket pipe connection 2 with a second retaining catch 1b—which is of a mirror-image configuration in relation to a first retaining catch 1a—a spacer 14 can be arranged and held in position between the recesses 18 of the two retaining catches 1a, 1b (see FIG. 4).

Figure 4:
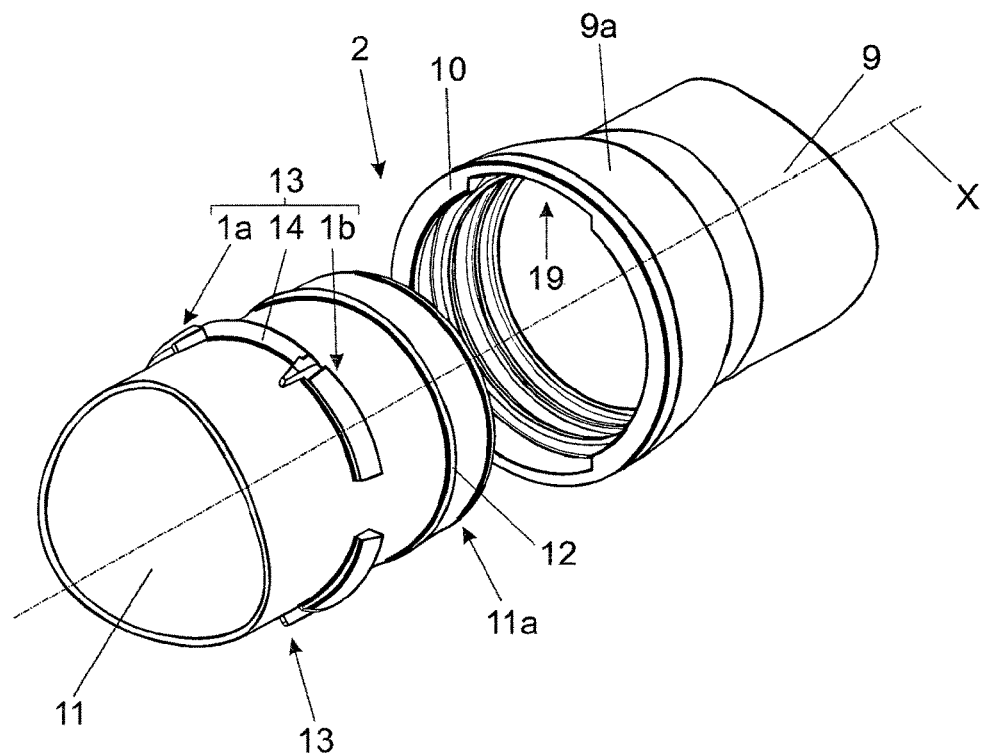
FIG. 4 is a proposed socket pipe connection during assembly.

FIG. 4 shows a perspective view of a socket pipe connection 2 during assembly. In this example, the socket pipe connection 2 includes an end of a first pipe 9, in the form of a socket 9a, a second end 11a of a second pipe 11, that is to be inserted into the socket 9a, and in total two clamping devices 13. In this case a clamping device 13 comprises a first retaining catch 1a, a second retaining catch 1b of a configuration in mirror-image relationship with the first retaining catch 1a, and a spacer 14 to be arranged between the retaining catches 1a, 1b.

To produce the socket pipe connection 2, the end 11a of the second pipe 11 is introduced in a known manner into the end of the first pipe 9, that is in the form of the socket 9a, until it bears at its end against a corresponding abutment within the socket 9a. Two retaining catches 1a, 1b which are of mirror-image configuration in relation to each other can be successively introduced into the socket 9a through the collar openings 19 on the limiting collar 10 of the socket 9a, until their respective collar contact surface 16 bears against the contact collar 12 of the pipe end 11a. The first retaining catch 1a is then displaced in relation to its insertion direction in the counter-clockwise direction along the contact collar 12 until its projection 7 bears against an end of the collar opening 19 on the limiting collar 10. Likewise, after having been introduced, the second retaining catch 1b is displaced in relation to its direction of insertion in the clockwise direction along the contact collar 12 until its projection 7 bears against the other end of the collar opening 19 on the limiting collar 10. A spacer 14 is subsequently arranged between the projections 7 of the two retaining catches 1a, 1b to fix the retaining catches 1a, 1 b in a stable position.

In the illustrated example there are a total of two clamping devices 13 for the socket pipe connection 2. Depending on the respective pipe diameter, it is also possible for only one or more than two such clamping devices 13 to be arranged along the periphery of a socket pipe connection 2.

Figure 5:
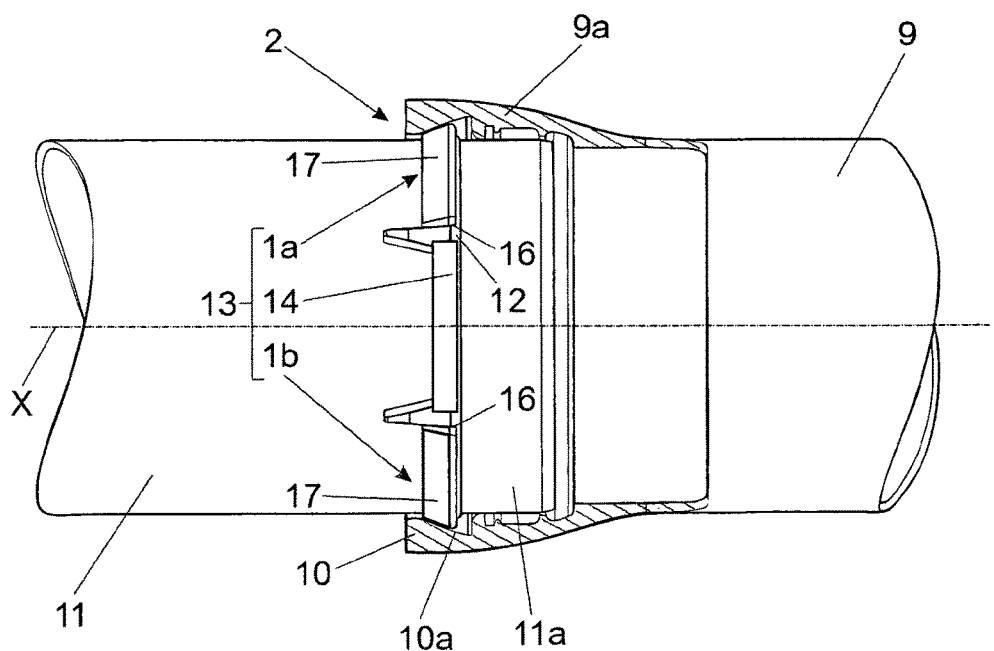
FIG. 5 is a partly broken-away view of a proposed socket pipe connection.

FIG. 5 shows a side view of the socket pipe connection 2 in FIG. 4, with the socket 9a of the first pipe 9 being partly broken away. Tensile forces acting along the pipe axis X in the case of such a socket pipe connection 2 can be passed by way of the contact collar 12 of the second pipe 11, the collar contact surface 16 of the retaining catches 1a, 1 b, that bears against the contact collar 12, the socket contact surface 17 of the retaining catches 1a, 1b, and the thrust surface 10a of the socket 9a of the first pipe 9 which bears thereagainst under a tensile force, into the socket 9a.

Figure 6A:
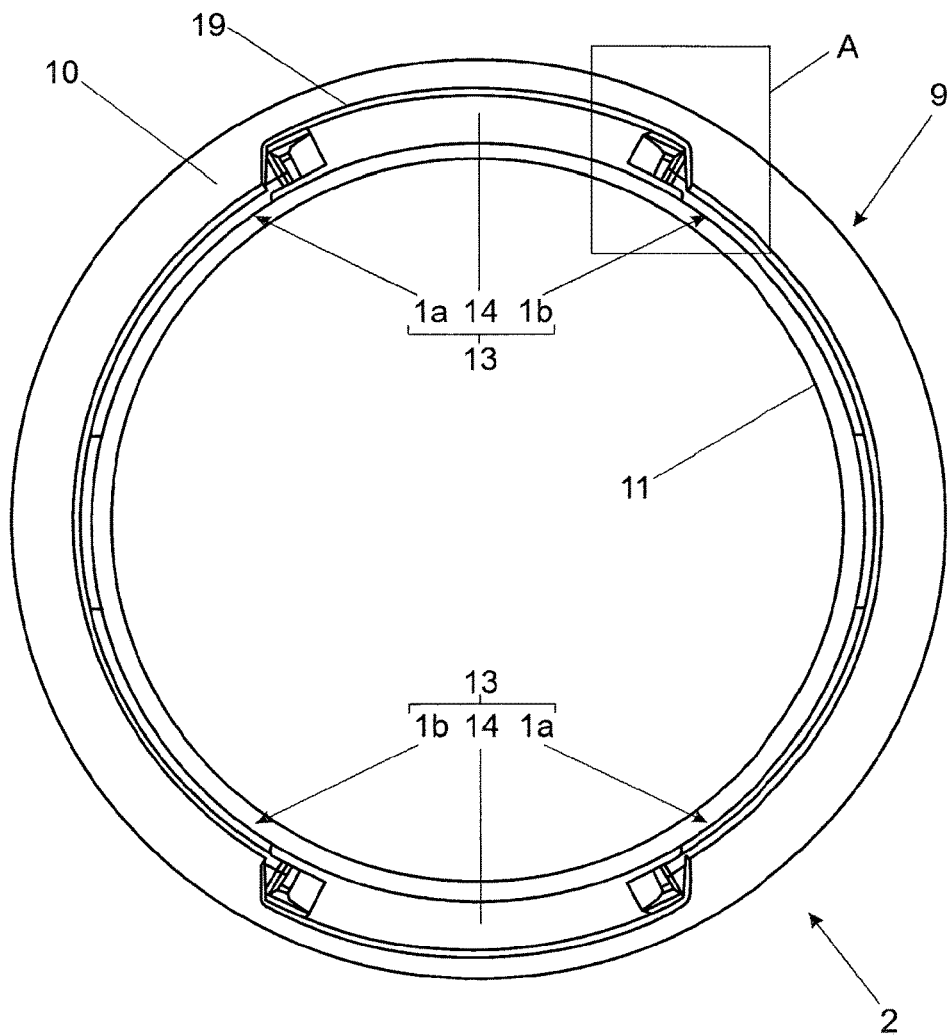
FIG. 6a is a front view along the pipe axis on to a proposed socket pipe connection.
Figure 6B:
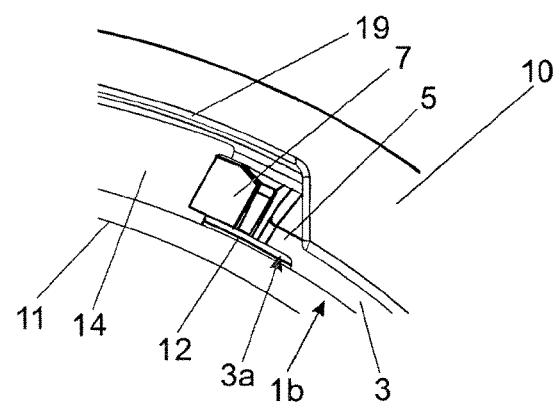

FIG. 6a shows a front view of the connected socket pipe connection 2 of FIG. 4 in a direction of viewing along the pipe axis X and FIG. 6b shows an enlarged detail view of the marked region A in FIG. 6a. The respective catch body 3 can be bent in the manner of a film hinge by virtue of the bending portion 5 with its reduction cross-section 6 which is reduced in relation to the catch cross-section 4, in the region of the end 3a of the catch body 3 of a retaining catch 1a, 1b. As a result, bending forces acting on the retaining catches 1a, 1b, by virtue of manufacturing fluctuations in the components of the socket pipe connection 2—in particular fluctuating inside radius $R_i$ of a retaining catch 1a, 1b, outside radius $R_R$ of the second pipe 11, socket contact surface 17 of a retaining catch 1a, 1b and thrust surface 10a of the socket 9a—can be nicely carried.

The invention claimed is:

1. A retaining catch for a socket pipe connection, said retaining catch comprising:
   a substantially circular-arcuate catch body on which is arranged a projection projecting from the catch body, the projection being located at an end of the catch body with respect to a direction of a circular-arcuate longitudinal extent of the catch body, the catch body having a catch cross-section in a cross-sectional plane in a radial direction transversely relative to the circular-arcuate longitudinal extent of the catch body,
   wherein the catch body has a bending portion, the bending portion of the catch body having a reduced cross-section which is reduced in size in relation to the catch cross-section when viewed in the radial direction, and
   wherein the projection has a recess and a nose configured to receive a spacer therein, the spacer to extend in a peripheral direction of the socket pipe connection so as to be located between the retaining catch and a second retaining catch positioned in a mirror-relationship with the retaining catch.

2. The retaining catch as set forth in claim 1, wherein the reduced cross-section is between 50% and 80% of the catch cross-section.

3. The retaining catch as set forth in claim 2, wherein the reduced cross-section is between 60% and 70% of the catch cross-section.

4. The retaining catch as set forth in claim 2, wherein the reduced cross-section is about 66% of the catch cross-section.

5. The retaining catch as set forth in claim 1, wherein a length of the bending portion is at least 10% of the circular-arcuate longitudinal extent of the catch body.

6. The retaining catch as set forth in claim 5, wherein the length of the bending portion is at least 15% of the circular-arcuate longitudinal extent of the catch body.

7. The retaining catch as set forth in claim 1, wherein the projection projects from the catch body in a direction perpendicular to a circular plane of the circular-arcuate catch body.

8. The retaining catch as set forth in claim 1, wherein the bending portion is arranged in a region of the projection.

9. The retaining catch as set forth in claim 1, wherein a transition from the catch cross-section to the reduced cross-section along the circular-arcuate longitudinal extent of the catch body is substantially arcuate.

10. The retaining catch as set forth claim 1, wherein the retaining catch at least partially comprises a plastic material.

11. The retaining catch as set forth claim 10, wherein the retaining catch substantially completely comprises a plastic material.

12. A socket pipe connection including:
    a first pipe end formed as a socket of a first pipe, an interior of the socket at least partially having a radially inwardly projecting peripherally extending limiting collar,
    a second pipe end of a second pipe to be introduced into the socket, the second pipe end at least partially having a peripherally extending contact collar, and
    the retaining catch as set forth in claim 1, the retaining catch being arranged between the limiting collar and the contact collar.

13. The socket pipe connection as set forth in claim 12, further including a clamping device comprising the retaining catch, the second retaining catch provided in the mirror-image relationship with the retaining catch, and the spacer, the spacer being arranged in the peripheral direction of the socket pipe connection between the first retaining catch and the second retaining catch.

14. The socket pipe connection as set forth in claim 13, wherein the spacer is arranged between mutually facing projections of the retaining catch and the second retaining catch.

* * * * *